US012755270B2

(12) United States Patent
Favreau et al.

(10) Patent No.: US 12,755,270 B2
(45) Date of Patent: Oct. 6, 2026

(54) METHOD FOR MANAGING A TRANSACTION WITH A SMART CARD

(71) Applicant: THALES DIS FRANCE SAS, Meudon (FR)

(72) Inventors: Valentin Favreau, Issy-les-Moulineaux (FR); Olivier Penalver, Paris (FR); Anne-Laure Bourg, Viroflay (FR)

(73) Assignee: THALES DIS FRANCE SAS, Meudon (FR)

( * ) Notice: Subject to any disclaimer, the term of this patent is extended or adjusted under 35 U.S.C. 154(b) by 69 days.

(21) Appl. No.: 18/548,601

(22) PCT Filed: Feb. 8, 2022

(86) PCT No.: PCT/EP2022/052956
§ 371 (c)(1),
(2) Date: Sep. 1, 2023

(87) PCT Pub. No.: WO2022/184385
PCT Pub. Date: Sep. 9, 2022

(65) Prior Publication Data
US 2024/0161088 A1 May 16, 2024

(30) Foreign Application Priority Data
Mar. 4, 2021 (EP) .................................... 21305259

(51) Int. Cl.
*G06Q 20/34* (2012.01)
*G06Q 20/38* (2012.01)

(52) U.S. Cl.
CPC ......... *G06Q 20/341* (2013.01); *G06Q 20/352* (2013.01); *G06Q 20/3829* (2013.01); *G06Q 2220/00* (2013.01)

(58) Field of Classification Search
CPC ............... G06Q 20/341; G06Q 20/352; G06Q 20/3829; G06Q 2220/00
See application file for complete search history.

(56) References Cited

U.S. PATENT DOCUMENTS 10,043,122 B1 * 8/2018 Koeppel .............. G06Q 20/352
11,005,302 B1 * 5/2021 Rule ....................... H02J 50/20
(Continued)

FOREIGN PATENT DOCUMENTS

EP 3001373 A1 3/2016

OTHER PUBLICATIONS

Ismail Turk, et al., RONFC: A Novel Enabler-Independent NFC Protocol for Mobile Transactions, Jul. 15, 2019, IEEE, pp. 95327-95340 (Year: 2019).*

(Continued)

*Primary Examiner* — Nilesh B Khatri

(57) ABSTRACT

Provided is a method for managing a transaction with a card allocated to a user comprising establishing a first communication link between the card and a terminal, receiving by the card, a transaction command comprising a parameter specific to the transaction, and, in response to detecting a preset event, turning on an internal battery embedded in the card, using power provided by said internal battery to send the parameter to a portable apparatus distinct from the terminal through a wireless communication channel, then turning off the internal battery, and in response to receipt of the parameter, providing the user with the parameter by the portable apparatus. Other embodiments disclosed.

6 Claims, 4 Drawing Sheets

(56) References Cited

U.S. PATENT DOCUMENTS

| | | | | |
|---|---|---|---|---|
| 11,010,765 | B2 * | 5/2021 | Terra | G06Q 20/409 |
| 2010/0327945 | A1 | 12/2010 | Caruana | |
| 2013/0080276 | A1 * | 3/2013 | Granbery | G06Q 20/3823 705/39 |
| 2013/0103523 | A1 * | 4/2013 | Okonkwo | G06Q 20/352 705/26.1 |
| 2013/0111555 | A1 * | 5/2013 | Leneel | G06F 21/44 726/4 |
| 2013/0317927 | A1 * | 11/2013 | Bush | G06Q 20/326 705/21 |
| 2014/0025520 | A1 * | 1/2014 | Mardikar | G06Q 20/204 705/44 |
| 2016/0086162 | A1 * | 3/2016 | Candelore | G06Q 20/405 705/44 |
| 2016/0260085 | A1 * | 9/2016 | Yen | G06Q 20/3278 |
| 2017/0364913 | A1 * | 12/2017 | Aabye | G06Q 40/12 |
| 2019/0034928 | A1 * | 1/2019 | Triplett | G06F 9/541 |
| 2020/0258066 | A1 * | 8/2020 | Tierney | G06Q 20/352 |
| 2020/0387895 | A1 * | 12/2020 | Shakkarwar | G06Q 20/3278 |
| 2021/0304189 | A1 * | 9/2021 | Gupta | G06Q 20/4012 |
| 2025/0022002 | A1 * | 1/2025 | Narula | G06Q 20/363 |

OTHER PUBLICATIONS

International Search Report (PCT/ISA/210) and Written Opinion (PCT/ISA/237) mailed on Jul. 14, 2022, by the European Patent Office as the International Searching Authority for current International Application No. PCT/EP2022/052956—[18 pages].

* cited by examiner

METHOD FOR MANAGING A TRANSACTION WITH A SMART CARD

FIELD

The present invention relates to methods for managing a transaction with a smart card. It relates particularly to methods in which a smart card and an application terminal are involved for carrying out a transaction.

BACKGROUND

Smart cards are portable small devices comprising a memory, a microprocessor and an operating system for computing treatments. They may comprise services applications like payment applications. Smart cards may be considered as secure elements. They comprise a plurality of memories of different types, like non-volatile memory and volatile memory. They are considered as tamper-resistant (or "secure") because they are able to control access to the data they contain and to authorize or not the use of their data by other machines. A smartcard may also provide computation services based on cryptographic components. In general, smartcards have limited computing resources and limited memory resources and they are intended to connect a host machine which may provide them with electric power either in contact mode or contactless mode.

A smart card may connect a terminal device to participate in a transaction. Transaction data may be presented to the cardholder by the terminal device. For instance, the amount of a payment transaction may be displayed by a Point-Of-Sale (POS) terminal.

Nevertheless the terminal may have been unduly modified and present inaccurate information to the cardholder.

There is a need to allow the cardholder to get the relevant transaction information through a way different from the terminal with which the smart card cooperates to make the transaction.

SUMMARY

The invention aims at solving the above mentioned technical problem.

An object of the present invention is a method for managing a transaction with a smart card allocated to a user. The method comprises a step of establishing a first communication link between the smart card and a terminal. The method comprises the step of receiving by the smart card, through said first communication link, a transaction command that comprises a parameter which is specific to the transaction. The method comprises a step in which, in response to detecting a preset event, an internal battery embedded in the smart card is turn on. The method comprises a step in which, using power provided by the internal battery, the parameter is sent to a portable apparatus distinct from the terminal through a wireless communication channel and in which then the internal battery is turn off. The method comprises a step in which, in response to receipt of the parameter, the portable apparatus provides the user with the parameter.

Advantageously, the smart card may receive from the terminal a transaction request which requests agreement of the smart card for completing the transaction and sending of a response to the transaction request may be the preset event.

Advantageously, receipt of the transaction command may be the preset event.

Advantageously, the transaction may be a contactless transaction, the first communication link may be established in response to a first tap which occurs when the smart card is placed within a proximity to the terminal, further to detecting a second tap, a second communication link may be established between the smart card and the terminal and the smart card may receive, through the second communication link, a transaction request which requests agreement of the smart card for completing the transaction.

Advantageously, the wireless communication channel may be a communication session established after a full Bluetooth Low Energy© connection phase.

Advantageously, the wireless communication channel may be the advertising mode as defined by Bluetooth Low Energy©.

Advantageously, the wireless communication channel may be secured based on keys previously stored in the smart card and the portable apparatus.

Advantageously, the smart card may turns off the internal battery when no signal has been received from the portable apparatus after a predefined duration.

Advantageously, the portable apparatus may record the parameter and the portable apparatus may provide the stored parameter as an evidence of an attempt of said transaction in response to an evidence request.

Another object of the present invention is a system comprising a smart card allocated to a user and a portable apparatus. The smart card is able to establish a first communication link with a terminal. The smart card is configured to receive, through the first communication link, a transaction command comprising a parameter specific to a transaction. The smart card is configured to, in response to detecting a preset event, turn on an internal battery embedded in the smart card, use power provided by said internal battery to send the parameter to the portable apparatus through a wireless communication channel, then turn off the internal battery. The portable apparatus is configured to provide the user with the parameter in response to receipt of the parameter.

Advantageously, the smart card may be configured to receive from the terminal a transaction request which requests agreement of the smart card for completing the transaction and sending of a response to the transaction request may be the preset event.

Advantageously, receipt of the transaction command may be the preset event.

Advantageously, the transaction may be a contactless transaction, the system may be configured to establish the first communication link in response to a first tap which occurs when the smart card is placed within a proximity to the terminal, further to detecting a second tap, the smart card may be configured to establish a second communication link with the terminal and the smart card may be configured to receive, through the second communication link, a transaction request which requests agreement of the smart card for completing the transaction.

Advantageously, the wireless communication channel may be the advertising mode as defined by Bluetooth Low Energy©.

Advantageously, the portable apparatus may be configured to record said parameter and to provide the stored parameter as an evidence of an attempt of said transaction in response to an evidence request.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF THE PREFERRED EMBODIMENTS

The invention may apply to any type of smart card associated to a user and intended to provide a service. The smart card may be a banking smart card, a transport card, an access badge or an identity document for instance.

The invention is well-suited for smart cards which are designed to communicate through a wireless protocol and at least another different communication protocol.

Figure 1:
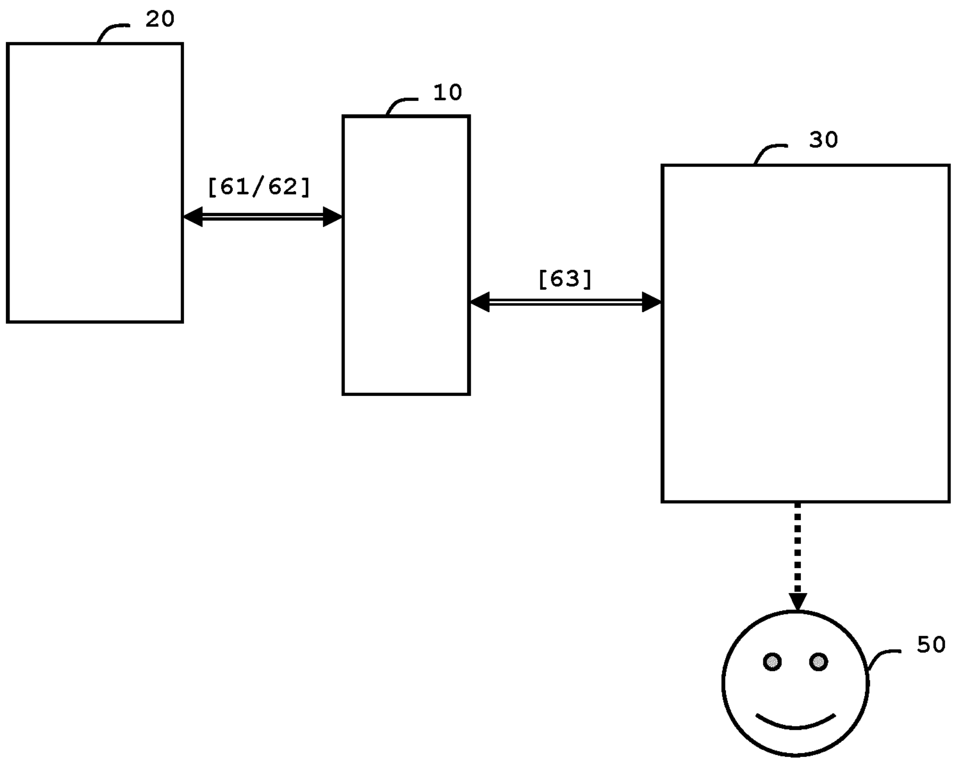
FIG. 1 shows a first exemplary architecture of a system according to an example of the invention.

FIG. 1 depicts a first exemplary architecture of a system according to an example of the invention.

In this example, the system comprises a smartcard 10, a portable apparatus 30 and a terminal 20. The smart card 10 may be a payment card associated to the portable apparatus 30 which may be a cell phone. The terminal may be a POS terminal. The smart card 10 may communicate with the mobile phone 30 through a wireless communication channel 63. The card 10 may communicate with the terminal 20 through a communication link 61 or 62 which may be established in contact or contactless mode.

The POS terminal 20 and the card 10 may communicate using NFC (Near Field Communication) technology which is based on the exchanging of data via a modulated magnetic field. A NFC reader has an antenna which is able to modulate the magnetic field and to provide energy to NFC card. The contactless card and the contactless POS terminal (comprising a NFC reader) may communicate thanks to an inductive coupling in a field frequency equal to 13.56 MHz. In particular, the IS014443, ISO/IE021481 and IS018092 standards provide modulation technologies and communication protocols which may be used in NFC domain. The POS terminal and the smartcard may be coupled using the Very High Data Rate (VHDR) protocol as defined by the TF2N653 document.

The POS terminal 20 and the card 10 may communicate using ISO/IEC-7816 protocols (like T=0 or T=1 for instance), through the SWP (Single Wire Protocol) or any relevant protocol in contact mode.

The portable apparatus 30 is an electronic device which has a user interface allowing to provide a user 50 (I.e. an individual) with data. For example, the user interface may include a display, a loudspeaker, a vibration system, a haptic feedback system or an image projector.

In some embodiments, the portable apparatus 30 may be a wearable device (like a watch, a key fob or a bracelet) or a tablet.

The smart card 10 and the terminal 20 are configured to cooperate for contributing to specific transactions like payments or access requests.

The smartcard may be an access badge while the terminal may be an access control unit which authorizes or denies access to a physical area (like a room or a building) according to the result of the transaction performed with the card 10.

Figure 2:
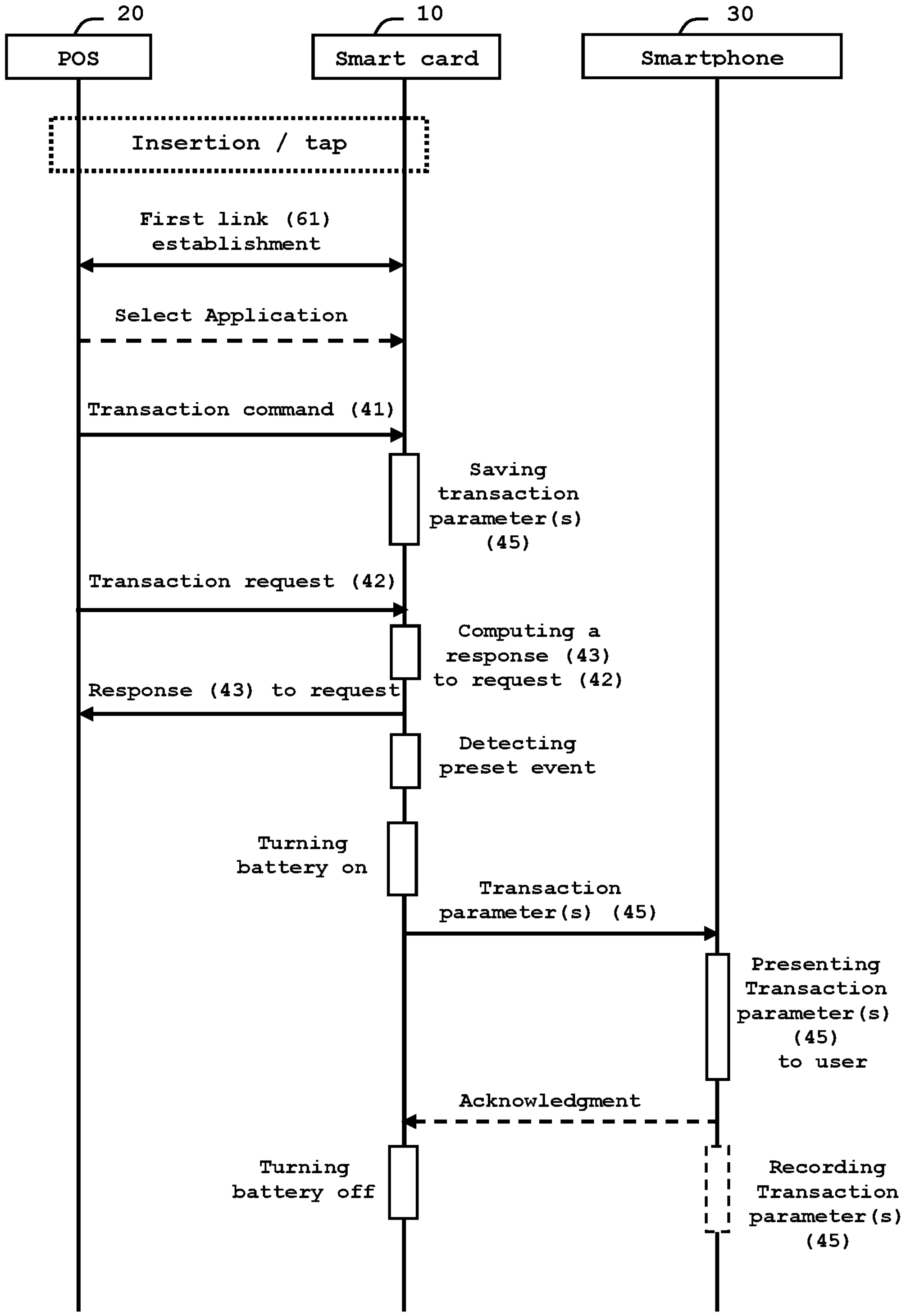
FIG. 2 shows a first exemplary flow diagram for managing a smartcard according to an example of the invention.

FIG. 2 depicts a first exemplary flow diagram for managing a smartcard according to an example of the invention.

In this example, the smart card 10 is a banking card intended to provide credentials to a POS terminal 20 for payment transactions. The smart card embeds an internal battery which is able to provide a limited amount of energy. The internal battery may be a rechargeable battery or a disposable battery.

The smartcard 10 may comprise a contactless communication interface designed to exchange data with the terminal 20 and a wireless communication interface designed to send data to a portable apparatus 30 which is distinct from the terminal 20. The wireless communication interface may comply with Bluetooth®, Bluetooth Low Energy® (BLE), or Wi-Fi® specifications. The terminal 20 may include a card reader able to communicate with using NFC technology.

In some embodiments, the smart card 10 may comply with requirements of EMV® Contactless Specifications for Payment Systems Version 2.6 or Version 3.0.

In some embodiments, the smart card 10 may comply with Visa® Integrated Circuit Card Specification (VIS) Version 1.6.x and Visa® Contactless Payment Specification (VCPS) Version 2.2.1 or upper.

In some embodiments, the smart card 10 may comply with M/Chip Advance Card Application Specification Version 1.2.x or Version 1.2.1 or upper.

During a first step, a communication link 61 is established between the smart card 10 and the terminal 20. Establishment of the communication link 61 may start in response to a tap which occurs when the smart card is placed within a proximity to the card reader unit of the terminal 20.

Optionally, the terminal may send a command to the card in order to select the relevant application. Such a select command may be useful when the card contains several payment applications for instance.

Then the terminal sends a transaction command 41 to the smart card through the communication link 61. The transaction command comprises one or several transaction parameters 45 which are specific to the transaction. For instance, the transaction command may be the Get Processing Options (GPO) command as specified in VIS 1.6 +UL3, VCPS2.2+UL2 from Visa®, or MChipAdvance v1.2.3 from Mastercard® or Référentiel CB Dual Interface v2.2.

The transaction parameters may include an amount, a currency, the time, the date, the name of the merchant, the location/type of the terminal and other elements.

Preferably, the card records the transaction parameters 45 in its own memory.

Then the terminal sends a transaction request 42 which requests agreement of the smart card for completing the transaction. For instance, the transaction request may be the Generate AC command compliant with EMV specifications.

The smart card receives the transaction request through the communication link 61 and computes a response 43 to the transaction request and sends it back to the terminal 20.

The sending of the response 43 to the transaction request 42 (by the smart card) may be interpreted by the smart card as a preset event.

In response to detecting this preset event, the card turns on its own an internal battery, then uses the power provided by its internal battery to send at least one transaction parameter to the portable apparatus 30 through a wireless communication channel 63, then turns off its internal battery.

When turning on its battery, the card allows access to use energy which may be provided by its battery. When turning off its battery, the card forbids access to use energy of the battery.

In response to receipt of the transaction parameter(s), the portable apparatus provides the user 50 (the cardholder) with the received transaction parameter(s). The portable apparatus may present the transaction parameter(s) by display on its own screen or via an audio channel for instance.

The portable apparatus may send an acknowledgement to the smart card in order to warn the smart card that the user has been provided with the transaction parameter(s). The card 10 may turn its internal battery off upon receipt of the acknowledgement sent by the portable apparatus.

In some embodiments, the smart card may turn off the internal battery when no signal has been received from the portable apparatus after a predefined duration. For instance, the smartcard may turn off its internal battery if no information has been received from the portable device after 5 seconds, 15 seconds or 1 minute.

Thanks to some embodiments of the invention, energy provided in the internal battery is saved since the battery is activated for a reduced period. An advantage is to allow to embed a small battery in the smart card since the capacity of a battery usually depends on its size. This allows to use cheaper battery and to ease implementation of the battery in the card body. Moreover, this allows a better flexibility of the card body taking into account the smallness of the battery which can have a great rigidity hardly compatible with the constraints of flexibility imposed by the specifications or the standards.

The portable apparatus may record the transaction parameter(s). The portable apparatus may provide the stored transaction parameter(s) as an evidence of an attempt of the transaction in response to an evidence request. Such an evidence request may originate from the user or from a distant electronic machine. Thus, the portable apparatus may be able to keep a track of the transactions in which the smart card has been involved and to monitor smartcard usage. Providing the stored transaction parameter(s) may replace the receipt usually printed by a POS terminal.

In some embodiments, the wireless communication channel 63 may be a communication session which is established after a full Bluetooth (or BLE) connection process. In such a case, a complete handshake phase is carried out between the smartcard and the portable apparatus before being able to send relevant data (transaction data) to the portable apparatus.

In some embodiments, the wireless communication channel 63 may be the advertising mode as defined by Bluetooth Low Energy©. The transaction parameter(s) can be provided directly in the advertisement data. Like this, the portable apparatus (E.g. phone) may quickly read the transaction parameters without doing the time consuming wireless connection process and therefore save battery power.

In such a mode, the card may send data without receiving any message from a portable apparatus. Advantageously, the smart card may automatically turn off its internal battery after a preset duration, regardless of receipt of a signal/data from a portable apparatus.

In some embodiments, the wireless communication channel 63 may be secured based one or several keys previously stored in the smart card and the portable apparatus. The exchanged data may be enciphered and/or signed with a symmetric algorithm or using a public/private key pair.

In some embodiments, the smartcard 10 may comprise a contact communication interface designed to exchange data with the terminal 20 and the terminal may include a card reader compliant with ISO/IEC7816 standards. Establishment of the communication link 61 may be triggered by insertion of the smart card in the card reader unit of the terminal 20.

Figure 3:
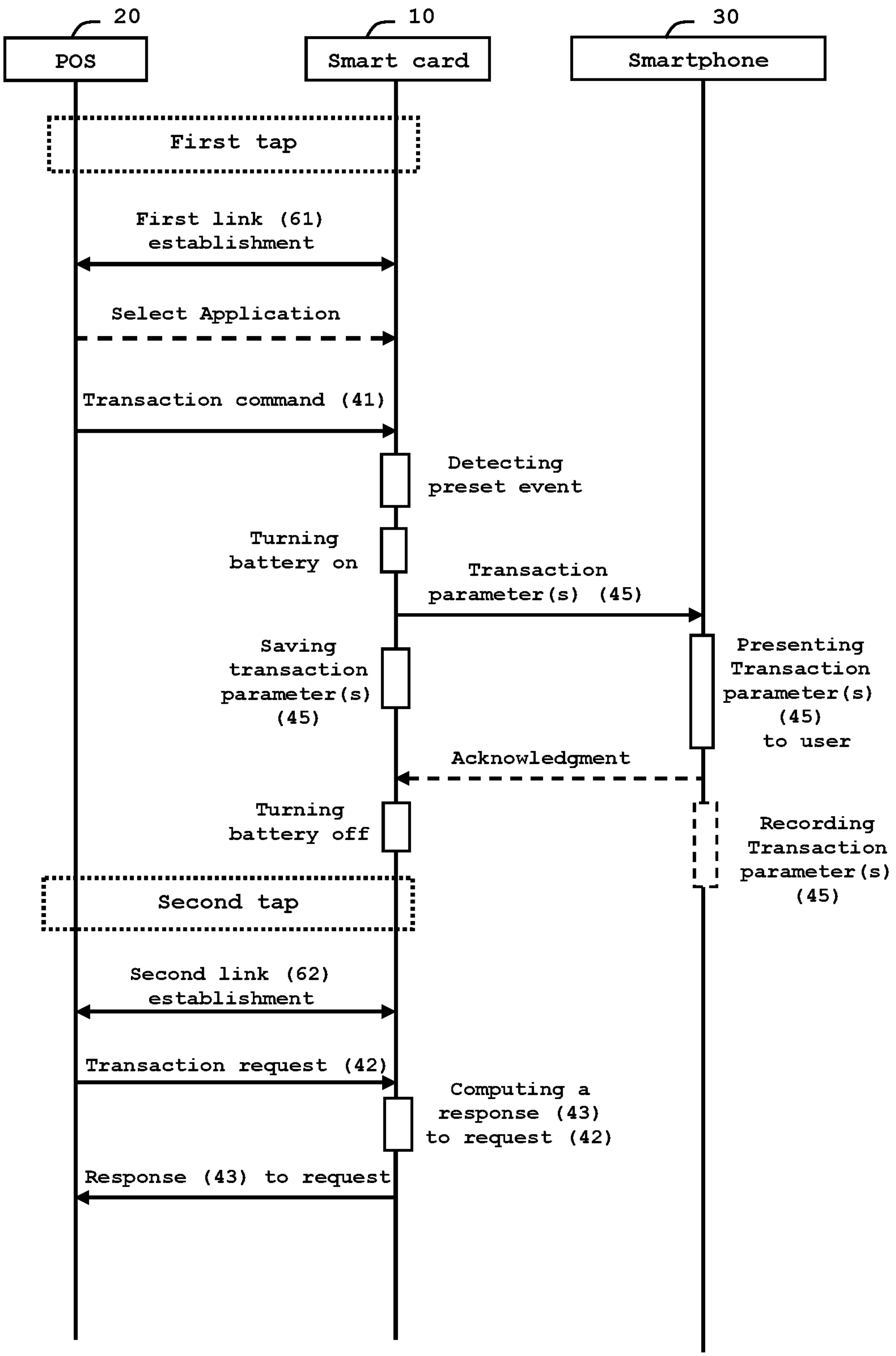
FIG. 3 shows a second exemplary flow diagram for managing a smart card according to an example of the invention.

FIG. 3 depicts a second exemplary flow diagram for managing a smart card according to an example of the invention.

In this example, the smart card 10 is a banking card intended to provide credentials to a POS terminal 20 for payment transactions. The smart card embeds an internal battery.

The smartcard 10 comprises a contactless communication interface designed to exchange data with the terminal 20 and a wireless communication interface designed to send data to a portable apparatus 30 which is distinct from the terminal 20. The wireless communication interface may comply with Bluetooth Low Energy® (BLE), or Li-Fi® specifications. The terminal 20 includes a card reader able to communicate with using a contactless technology compliant with the one of the smart card.

During a first step, a first communication link 61 is established between the smart card 10 and the terminal 20 in response to a first tap which occurs when the smart card is placed within a proximity to the card reader unit of the terminal 20.

Optionally, the terminal may send a command to the card in order to select the relevant application. Such a select command may allow to activate a specific payment application in the smart card 10.

Preferably, the select command may comply with any of the specifications previously listed for the Get Processing Options (GPO) command.

Then the terminal sends a transaction command 41 to the smart card through the first communication link 61. The transaction command comprises at least one transaction parameter 45 which is specific to the transaction. The transaction command may be the Get Processing Options (GPO) command compliant with EMV specifications.

The transaction parameters may include an amount, a currency, a country, a state, the time, the date, the name of the merchant, the location/type of the terminal and other elements.

The receipt of the transaction command 41 (by the smart card) may be interpreted by the smart card as a preset event.

In response to detecting this preset event, the card turns on its own internal battery, then uses the power provided by its internal battery to send at least one transaction parameter to the portable apparatus 30 through a wireless communication channel 63, then turns off its internal battery.

In response to receipt of the transaction parameter(s), the portable apparatus 30 provides the user 50 with the received transaction parameter(s). The portable apparatus may present the transaction parameter(s) by display on its own screen or via an audio/sound channel.

The portable apparatus may send an acknowledgement to the smart card in order to warn the smart card that the transaction parameter(s) has been presented to the user. The card 10 may turn its internal battery off upon receipt of the acknowledgement sent by the portable apparatus.

In some embodiments, the smart card may turn off the internal battery when no signal has been received from the portable apparatus after a predefined duration. For instance, the smartcard may turn off its internal battery if no information has been received from the portable device after 3 seconds, 10 seconds or 90 seconds.

The smart card may record the transaction parameter(s) in its own non-volatile memory in order to be able to use the transaction parameter(s) during a further phase.

The portable apparatus may record the received transaction parameter(s) in its own non-volatile memory. In a further step, the portable apparatus may provide (in response to an evidence request) a subset of the stored transaction parameter(s) as an evidence of an attempt of the transaction. An evidence request may originate from the user or from another electronic machine. Thus, the portable apparatus may be able to keep a history of the transactions in which the smart card has been involved and to monitor smart card usage.

During a further step, a second communication link 62 is established between the smart card 10 and the terminal 20 in response to a second tap which occurs when the smart card is placed within a proximity to the card reader unit of the terminal 20.

Then the terminal may send a transaction request 42 which requests agreement of the smart card for completing the transaction. For instance, the transaction request may be the Generate AC command compliant with EMV specifications.

Preferably, the Generate AC command may comply with any of the specifications previously listed for the Get Processing Options (GPO) command.

The smart card receives the transaction request through the second communication link 62 and may compute a response 43 to the transaction request and send it back to the terminal 20. If the card previously saved the transaction parameter(s), it may use it/them for generating the response 43.

It is to be noted that the user may make the decision to trigger the second tap only if the parameter(s) provided by the portable apparatus 30 is/are satisfactory or consistent with the context of the transaction. An advantage of some embodiments of the invention is to allow the cardholder to provide (or not) their consent to the transaction after checking the transaction parameter(s) provided by the portable apparatus.

Thanks to some embodiments of the invention, the amount of energy taken from the internal battery is kept to a minimum. This helps to extend the life of the battery (if it is not reloadable) or to postpone the moment when a refill will be necessary.

Preferably, the portable apparatus may be a connected watch or smartphone and the wireless communication channel 63 may rely on BLE technology.

In some embodiments, the wireless communication channel 63 may be the advertising mode as defined by Bluetooth Low Energy©. In such a mode, the smart card may send data without receiving any message or data from the portable apparatus. Advantageously, the smart card may automatically turn off its internal battery after a preset duration of advertising.

In some embodiments, the smart card may encipher and/or sign the data sent through the wireless communication channel 63 by using a pre-stored key.

Figure 4:
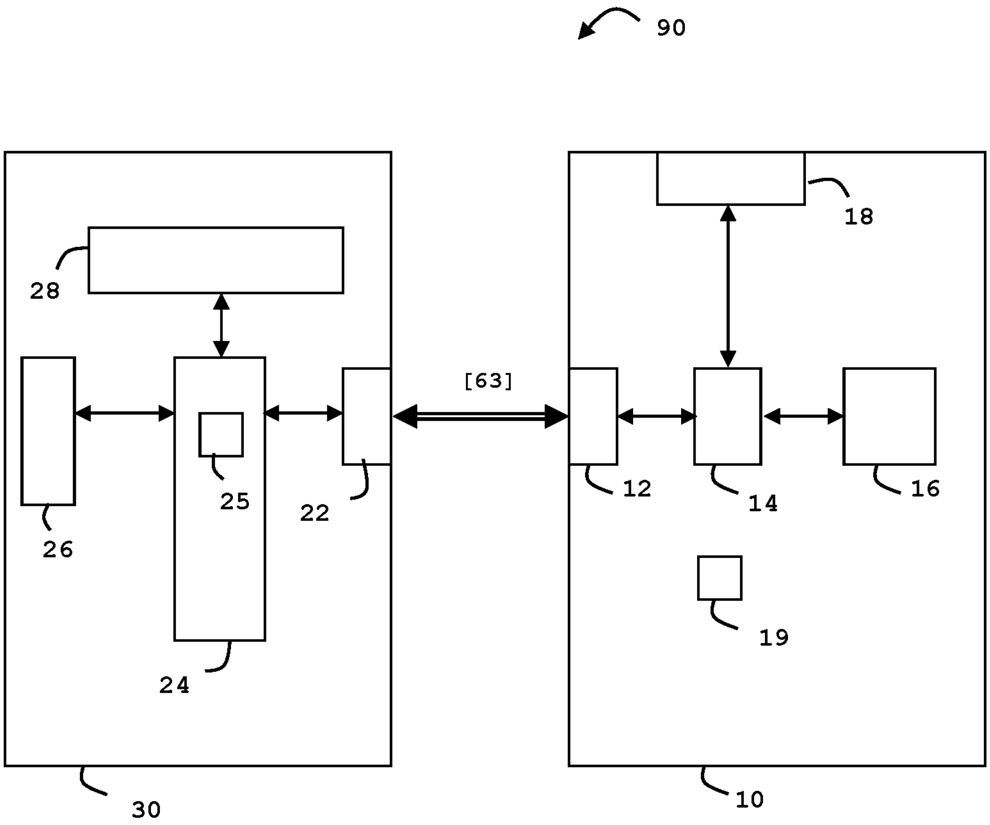
FIG. 4 shows a diagram of architecture of a smart card and a paired portable apparatus according to an example of the invention.

FIG. 4 shows a diagram of architecture of a smart card and a paired portable apparatus according to an example of the invention.

The system 90 of FIG. 4 comprises a smart card 10 and a portable apparatus 30.

In this example, the smart card 10 is an access badge allocated to a user and containing credentials allowing to get access to an area having a specific security level.

The smart card 10 comprises a secure chip 14 (also called secure element), an internal battery 16, a physical communication interface 12 designed to communicate wirelessly with the portable apparatus 30 and a physical communication interface 18 designed to communicate with a transaction terminal in contact or contactless mode.

The smart card 10 may comprise a key 19 intended to be used to secure the data exchanged with the portable apparatus 30.

The secure element 14 may be a conventional smart card chip with additional features. The secure element 14 may comprise a processor and a set of software and/or hardware instructions which are executed by the processor to perform the functions of the secure element. The secure element may be adapted to receive, through the physical communication interface 18, a transaction command (ex: GPO) comprising at least one parameter specific to a transaction in which the smart card 10 and a terminal are involved. The instructions may be designed to detect a preset event and in response to detecting the preset event, turning on the internal battery 16, using power provided by the internal battery to send at least one transaction parameter to the portable apparatus through a wireless communication channel 63, then turning off the internal battery.

The secure element may be adapted to interpret the receipt of the transaction command as being the preset event.

The secure element may be adapted to receive, through the physical communication interface 18, a transaction request which requests agreement of the smart card for completing a transaction, to compute and to send a response to the transaction request and to consider that the preset event is the sending of the response.

The secure element may be adapted to send a transaction parameter to the portable apparatus through a wireless communication channel which is the advertising mode as defined by Bluetooth Low Energy©.

The secure element may be adapted to send a transaction parameter to the portable apparatus through a wireless communication channel which is a communication session established after a full Bluetooth Low Energy© connection phase.

The secure element may be adapted to turn off the internal battery when no signal has been received from the portable apparatus after a predefined duration.

The secure element may be adapted to automatically turn off the internal battery after a preset duration.

The portable apparatus 30 may be a wearable device comprising a card controller unit 24 including a chip and software instructions. The portable apparatus 30 may comprise a non-volatile memory 28, a physical user interface 26 and a physical communication interface 22 able to wirelessly receive data from the smart card 10.

The physical user interface 26 may include a display, a speaker and/or a haptic feedback device.

The portable apparatus 30 may store a key 25 in the card controller unit 24 or in the non-volatile memory 28 and may be adapted to decipher (and/or to check a signature of) the data received from the smart card 10 using the key 25. The portable apparatus 30 may store an identifier of the smart card in addition to the key 25.

The portable apparatus 30 is said to be paired to the smart card when it stores a secret value or a key allowing to securely access the content of the encipher/signed data sent by the smart card.

The portable apparatus 30 is configured to provide the user with a transaction parameter in response to receipt of the transaction parameter from the smart card 10.

The portable apparatus may be configured to record the parameter(s) received from the card 10 and to provide the stored parameter(s) as an evidence of an attempt of a transaction in response to an evidence request.

The invention is not limited to the described embodiments or examples. In particular, the described examples and embodiments may be combined.

The invention is not limited to Banking smart cards and applies to any smart cards allocated to a user.

The smart card may extract a plurality of transaction parameters from the transaction command sent by the terminal and forward the plurality of transaction parameters to the portable apparatus which may provide the user with a subset of transaction parameters.

A portable apparatus may be paired to several smart cards and may present a transaction parameter to the user via a channel which depends on the card or card type. For instance, a transaction parameter may be provided by audio if the card is a banking card and displayed if the card is a loyalty card.

Although examples of the invention have been mainly provided in the banking domain, the invention also applies to other domains. For example, the smart card may provide access to a virtual area, a physical area like a building or a transport network.

The invention claimed is:

1. A system for performing a contactless payment transaction comprising:

a smart card allocated to a user; and a portable apparatus, wherein the smart card is configured to:

successively receive a Get Processing Options command as defined by Europay Mastercard Visa (EMV) specifications from a point-of-sale terminal;

send a response to the Get Processing Options command to the point-of-sale terminal;

receive a Generate Application cryptogram (AC) command from the point-of-saleterminal, as defined by EMV specifications;

send a response to the Generate AC command to the point-of-sale terminal:

wherein the smart card is a banking card configured to establish a first communication link with the point-of-sale terminal in response to a first tap that occurs when the smart card is placed within a proximity to the point-of-sale terminal, wherein the smart card is configured to receive, through the first communication link, the Get Processing Options command comprising a transaction amount specific to a contactless payment transaction, wherein the smart card, in response to detecting receipt of the Get Processing Options command, is configured to turn on an internal battery embedded in the smart card, wherein turning on the internal battery is triggered exclusively by receipt of the Get Processing Options command, use power of said internal battery to send the transaction amount to the portable apparatus through a wireless communication channel, and record said transaction amount in a non-volatile memory embedded in the smart card, and turn off the internal battery, wherein the portable apparatus is configured to provide the user with the transaction amount in response to receiving said transaction amount to enable user verification of transaction amount outside of the point-of-sale terminal's control; and wherein the smart card is further configured to:

detect a subsequent second tap;

establish a second communication link with the point-of-sale terminal;

receive, through the second communication link, the Generate AC command which requests agreement of the smart card for completing said contactless payment transaction;

resume said contactless payment transaction upon receipt of the Generate AC command; and compute a response to the Generate AC command using the transaction amount stored in the non-volatile memory embedded in the smart card that was received through the first communication link to provide cryptographic authentication based on the independently verified transaction amount.

2. The system according to claim 1, wherein the wireless communication channel operates in an advertising mode as defined by Bluetooth Low Energy specifications.

3. The system according to claim 1, wherein the smart card is further configured to secure the wireless communication channel with keys previously stored in the smart card and the portable apparatus.

4. The system according to claim 1, wherein the smart card is further configured to, upon determining a predefined duration, turn off the internal battery responsive to detecting it has not received a signal from the portable apparatus within the predefined duration.

5. The system according to claim 1, wherein the portable apparatus is further configured to record in its own memory said transaction amount and provide the stored transaction amount from said memory as an evidence of an attempt of said contactless payment transaction in response to an evidence request.

6. The system according to claim 1, wherein the portable apparatus is a connected watch or a smartphone.

* * * * *